Oct. 9, 1962　　　J. A. MALACHICK　　　3,057,525
VISUAL DISPENSERS FOR CEREAL AND THE LIKE
Filed Oct. 24, 1960　　　　　　　　　　　　　　　3 Sheets-Sheet 1
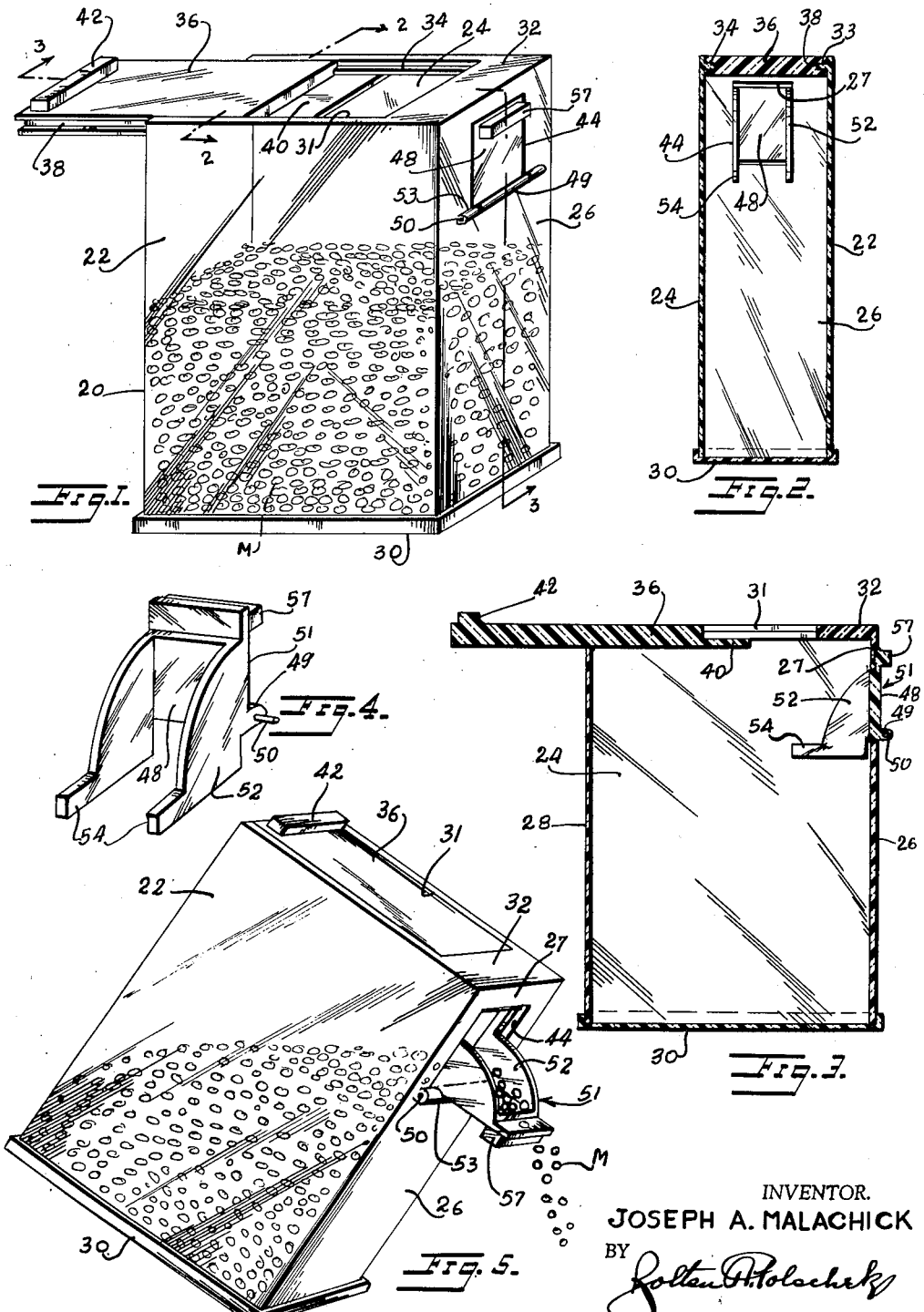
INVENTOR.
JOSEPH A. MALACHICK
BY
ATTORNEY

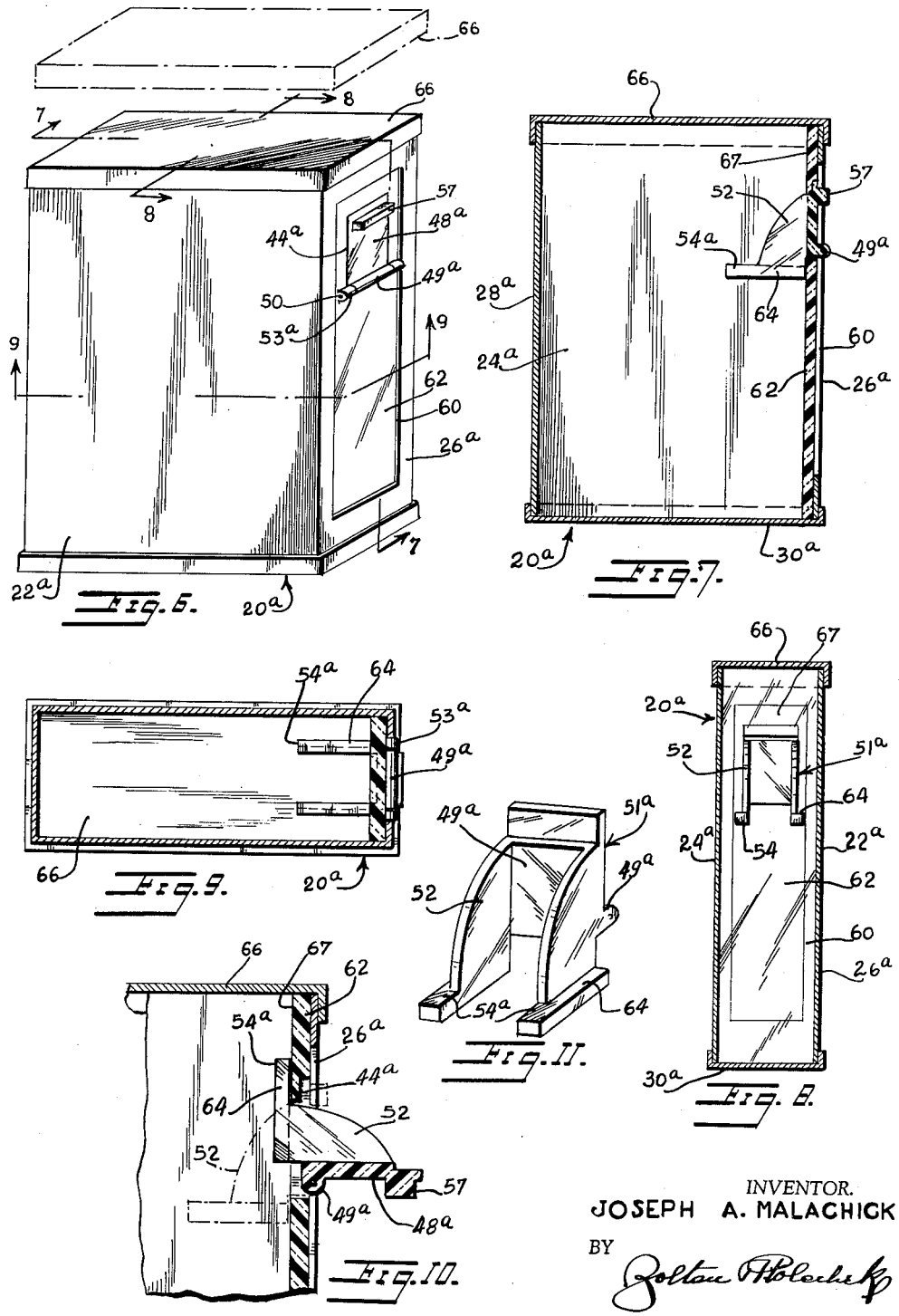

Oct. 9, 1962 J. A. MALACHICK 3,057,525
VISUAL DISPENSERS FOR CEREAL AND THE LIKE
Filed Oct. 24, 1960 3 Sheets-Sheet 3
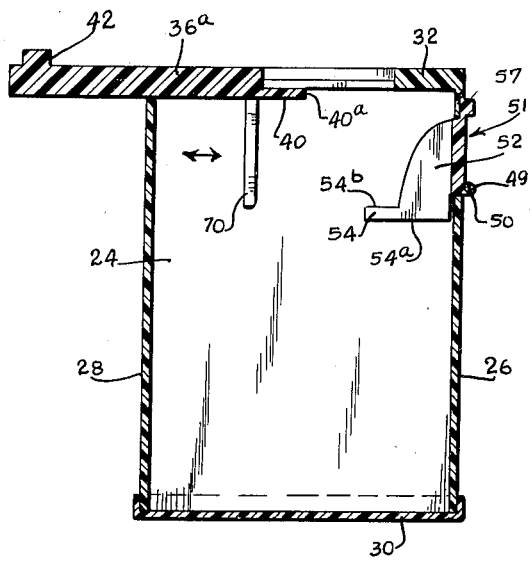
Fig. 12.
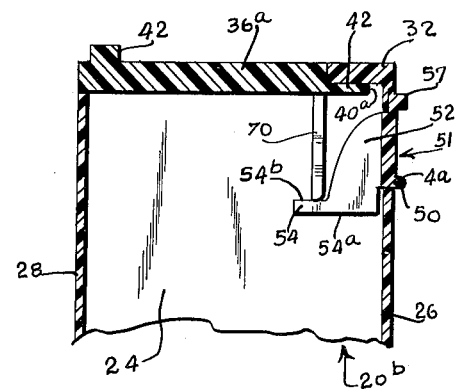
Fig. 13.
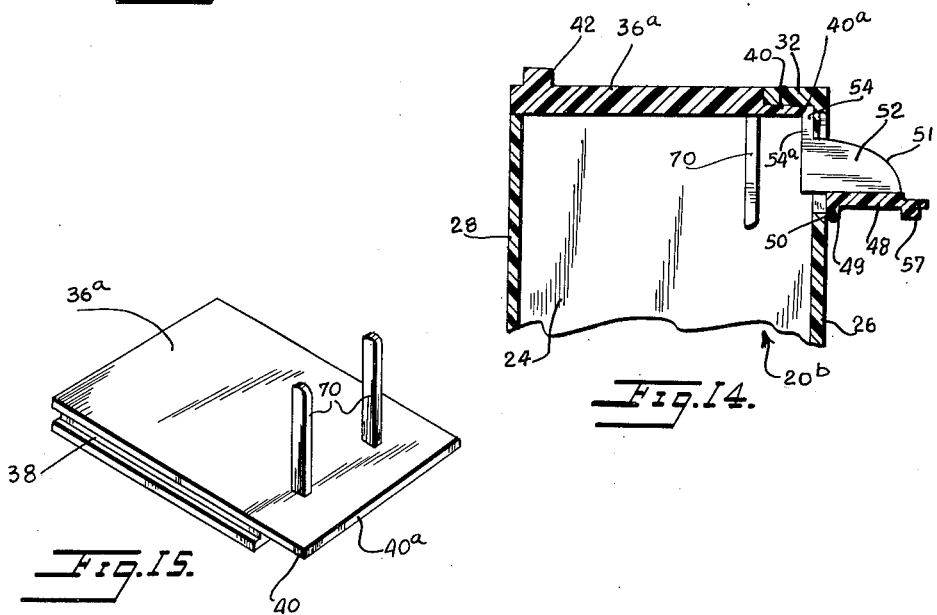
Fig. 14.
Fig. 15.
INVENTOR.
JOSEPH A. MALACHICK
BY
ATTORNEY

United States Patent Office

3,057,525
Patented Oct. 9, 1962

3,057,525
VISUAL DISPENSERS FOR CEREAL AND
THE LIKE
Joseph A. Malachick, 1046 Stratford Ave., Bronx, N.Y.
Filed Oct. 24, 1960, Ser. No. 64,331
1 Claim. (Cl. 222—482)

This invention concerns a storage and dispensing container for cereals, detergents, and other granular materials.

According to the invention there is provided a hollow casing which may have a slidable or removable top cover. The container may be filled by retracting or removing the cover. One end wall of the container is provided with a retractable spout for dispensing the contents of the container. A transparent panel is provided in the end wall supporting the spout. In another form of the invention the retractable spout and cover are arranged so that the cover must be retracted before the spout can be opened or closed and when the cover is closed the spout is held in open position or closed position to whichever it may be set.

It is, therefore, a principal object of the invention to provide a hollow casing for holding, storing and dispensing granular material.

It is a further object to provide a hollow casing with a retractable spout and transparent end wall.

It is a still further object to provide a hollow casing with a retractable spout and top cover, the spout being movable to open and closed positions only when the cover is retracted and being held in the open position or closed position when the cover is closed.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a perspective view of one container embodying the invention with cover open and spout closed.

FIG. 2 is a vertical cross-sectional view taken on line 2—2 of FIG. 1.

FIG. 3 is a vertical side sectional view taken on line 3—3 of FIG. 1.

FIG. 4 is a perspective view of the spout per se.

FIG. 5 is a perspective view of the container with cover closed and spout open.

FIG. 6 is a perspective view of another container with cover and spout closed.

FIGS. 7, 8 and 9 are sectional views taken on lines 7—7, 8—8 and 9—9 of FIG. 6.

FIG. 10 is a fragmentary sectional view on an enlarged scale of the container of FIG. 6 showing the spout in open position.

FIG. 11 is a perspective view of the spout per se as employed in the container of FIGS. 6–10.

FIG. 12 is a sectional view similar to FIG. 2 showing still another container construction according to the invention.

FIG. 13 is a fragmentary sectional view of the container of FIG. 12 showing the cover and spout in closed positions.

FIG. 14 is a fragmentary sectional view of the container of FIG. 12 showing the cover closed and the spout open.

FIG. 15 is a perspective view of the cover of the container of FIG. 12, the cover being shown in an inverted position.

The container shown in FIGS. 1–5, includes a hollow rectangular transparent plastic casing generally designated 20. The casing has side panels or walls 22, 24, a front panel or wall 26, a rear wall 28, a bottom plate 30, and a short top plate 32. Near the open top of the casing are rails 33 and 34 mounted on walls 22 and 24, respectively. A cover plate 36 is provided for closing the opening 31 in the top of the casing. This plate has lateral grooves 38 which engage slidably the rails 33 and 34. Plate 36 has a lower forwardly extending ledge 40 adapted to extend under the short top plate 32 when the cover plate is closed. On top of the plate 36 at its outer end is a handle bar 42 for sliding the cover open and closed on the casing.

In the front wall 26 is provided an upper rectangular opening 44. In this opening is mounted a plastic spout 51; see FIG. 4. The spout has a front rectangular wall or panel plate 48 which is mounted by a hinge member 49 and pin 50 to hinge member 53 on front wall 26. At the ends of wall 48, the spout is formed with two arcuate side panels 52. The sides are extended at their free ends to form two lugs 54. These lugs serve as stop elements to abut the top edge 27 of wall 26 at its inner side to prevent or limit further outward movement of the spout beyond the open position shown in FIG. 5. A handle 57 for the spout is provided at the top of wall 48.

Transparent walls 22, 24, 26 and 28 serve as windows to provide a view at all times of the nature, quality and quantity of the contents of the casing. The cover 36 when closed covers opening 31 and when open permits the casing to be filled with desired granular material. The spout provides a controllable outlet for dispensing material M from the casing.

In the form of the invention shown in FIGS. 6 through 10, the casing 20$^a$ has side, front, rear and bottom walls 22$^a$, 24$^a$, 26$^a$, 28$^a$ and 30$^a$ made of metal rather than plastic. A rectangular opening 60 is formed in the front wall 26$^a$. Behind the frame thus defined by wall 26$^a$ there is secured a transparent plastic panel or window 62. In panel 62 is formed rectangular opening 44$^a$. Spout 51$^a$ is mounted pivotally in the opening by hinge members 49$^a$ and 53$^a$ on the plate 48$^a$ of the spout and panel 62, respectively. Lateral extensions 64 are provided on the lugs 54$^a$ of the spout as shown in FIG. 11. These extensions engage side edges of the opening 60 when the spout is in open position as shown in FIG. 10, while the free ends of the lugs engage behind the rear side of the top end 67 of panel 62. A removable metal cover 66 is provided to close the open top of the casing.

In the form of the invention shown in FIGS. 12–15, container 20$^b$ has two depending fingers 70 secured parallel to each other in the bottom of the retractable cover 63$^a$. When the cover is closed as shown in FIGS. 13 and 14 the forward edge 40$^a$ of ledge 40 terminates just short of the adjacent inner side 57 of the top of wall 26. If the spout is open as shown in FIG. 14, the edge 40$^a$ will abut the rear edges 54$^a$ of the vertical lugs 54 and hold the spout in open position. If the spout is closed as shown in FIG. 13, then the free ends of the fingers 70 abut the top edges 54$^b$ of the horizontal lugs and prevent the spout from closing. The spout can only be open or closed when the cover 36$^a$ is retracted as shown in FIG. 12. The fingers 70 serve the additional function of stop elements to prevent inadvertent removal of the cover from the top of the casing. The retractable cover thus serves to permit opening and closing of the spout when it is retracted. When the cover is closed it prevents opening of the spout if the spout is closed and prevents closing the spout if the spout is opened. In all other respects the container of FIGS. 12–15 is identical with that of container 20 in FIGS. 1–5, and corresponds parts are identically numbered.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A container for granular materials or the like, comprising a generally rectangular hollow casing, said casing having side, front, rear, top and bottom walls, said top wall being shortened to provide a rectangular opening at the top of the casing, a pair of rails disposed near said opening and mounted on said side walls, a cover slidably mounted on said rails, said cover having a forwardly extending ledge adapted to fit under the top wall when the cover is closed, said front wall having a rectangular opening therein, and a spout pivotally mounted in said latter opening, said walls and cover being formed of transparent plastic material, said spout including a plate having a hinge element at one edge adapted to coact with a hinge element on said front wall for opening and closing the spout, said spout further having rearwardly extending sides joined to lateral edges of the plate, said sides having lugs extending from rear ends thereof for engaging at the top of said front wall on the inner side thereof when the spout is open, said ledge terminating short of said inner side of the top of the front wall when the cover is closed, the free ends of the lugs fitting between the free edge of the ledge and said inner side of the front wall when the spout is open so that the cover holds the spout open.

References Cited in the file of this patent

UNITED STATES PATENTS

| | | |
|---|---|---|
| 2,069,738 | Buchen | Feb. 9, 1937 |
| 2,745,577 | Davis | May 15, 1956 |
| 2,872,951 | Wilkerson | Feb. 10, 1959 |
| 2,921,720 | Malachick | Jan. 19, 1960 |